Oct. 28, 1952     E. P. HARRIS ET AL     2,615,491

APPARATUS FOR REINFORCING AIR HOSE

Filed May 8, 1951                               3 Sheets-Sheet 1

INVENTORS
EDWARD P. HARRIS
FREDRICK W. SAMPSON
BY

THEIR ATTORNEYS

Oct. 28, 1952  E. P. HARRIS ET AL  2,615,491
APPARATUS FOR REINFORCING AIR HOSE
Filed May 8, 1951  3 Sheets-Sheet 3
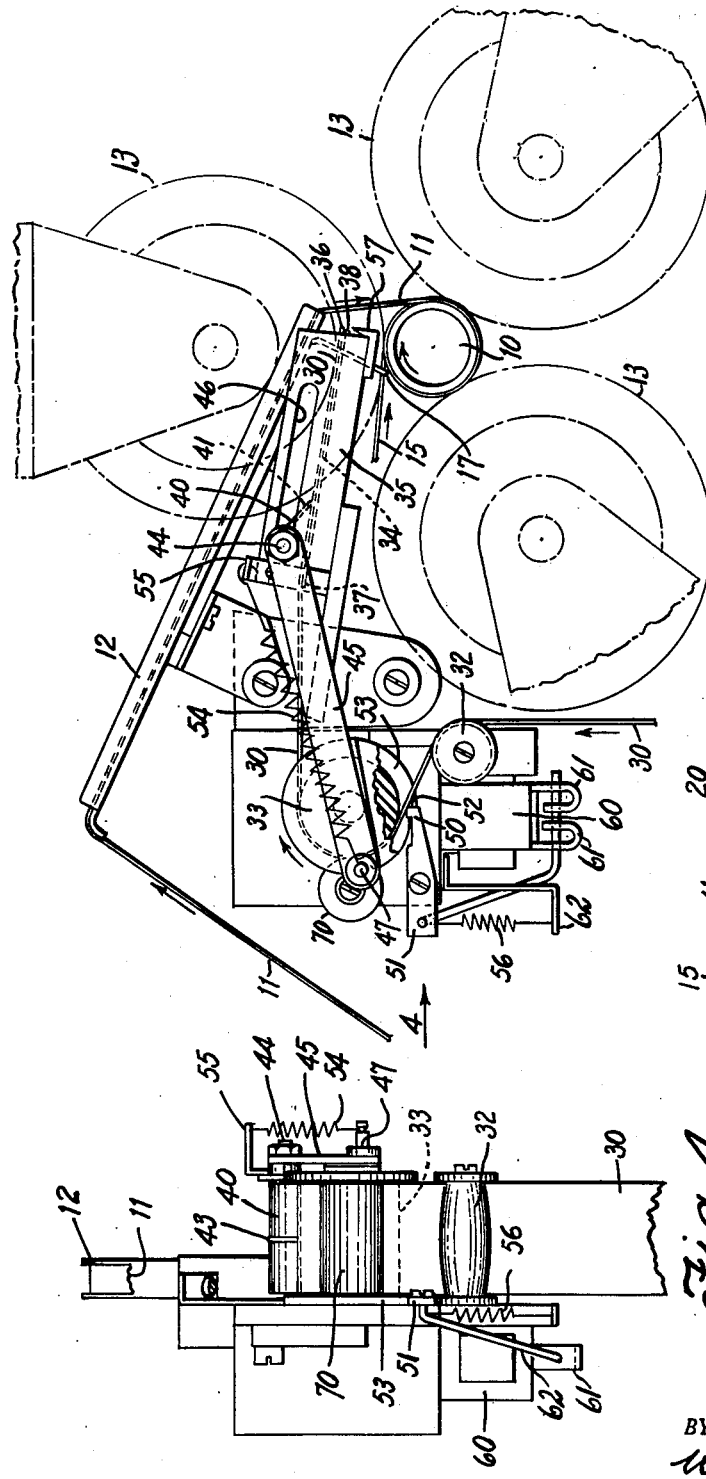
INVENTORS
EDWARD P. HARRIS
FREDRICK W. SAMPSON
BY
Willits Hardman & Fehr
THEIR ATTORNEYS Patented Oct. 28, 1952

2,615,491

UNITED STATES PATENT OFFICE 2,615,491

APPARATUS FOR REINFORCING AIR HOSE

Edward P. Harris and Frederick W. Sampson, Dayton, Ohio, assignors to General Motors Corporation, Detroit, Mich., a corporation of Delaware Application May 8, 1951, Serial No. 225,202

4 Claims. (Cl. 154—6)

This invention relates to a thin-wall flexible helically wrapped hose of the type adapted to convey air at low pressure for circulating air in automobile bodies and for like uses.

The general object of this invention is to provide an improved method and machine for making a helically wrapped main hose structure in lengths of 15 to 20 feet and having relatively short reinforcing sections of only several inches long on the inside surface thereof, said sections being spaced along the length of the hose at the locations where the long hose is to be subsequently cut in two to form the final shorter pieces of hose.

An object of the invention is to provide an apparatus for making such a relatively long hose structure by automatically adding reinforcing wrappings from a separate roll of reinforcing tape to form interior reinforcing sections spaced along the length of the main hose structure.

The main hose structure may be made by continuously helically wrapping a flexible ribbon of hose material (such as rubberized fabric) upon a rotating and axially travelling mandrel in a well-known manner. The mandrel ordinarily is made in sections, say 20 feet in length, and these sections are coupled together end to end as needed to provide in effect a continuous length of mandrel travelling axially thru the wrapping machine. As each 20 ft. mandrel section passes thru the machine and emerges with the hose structure wrapped thereon over its full length, the wrapped hose structure is cut in two at the mandrel coupling and the fully-wrapped mandrel section is uncoupled and removed from the wrapping machine. The thus disconnected fully-wrapped mandrel sections are subsequently put into a curing retort to properly vulcanize the vulcanizable material and integrate the helical wrappings of the hose structure while in situ upon the mandrel section. After curing is completed the 20 foot length of cured hose is removed from its mandrel section, and subsequently cut into the desired short lengths for ultimate use. For instance, a twenty foot length of hose may be cut into ten pieces each two feet in length. All of the above procedures described in this paragraph are well known in the art, hence need not be described in great detail herein.

This invention relates to an improved method and machine for providing extra reinforcing wrappings which are spaced along the length of the long hose section (20 ft. in the above example) so as to extend on both sides of the dividing line where the long hose will be cut to form the final shorter pieces, and thereby provide reinforced ends on said shorter pieces. Such end reinforcements strengthen and stiffen the otherwise quite flexible ends of the hose pieces and greatly facilitate and simplify the telescoping of the hose ends over pipes or other similar fittings to which they are connected. By so reinforcing the hose ends the remaining portions of the hose may be made more flexible and with less material therein, thus economizing in the amount of material used in each short piece of hose.

Further objects and advantages of the present invention will be apparent from the following description reference being made to the accompanying drawings wherein a preferred embodiment of the present invention is clearly shown.

In the drawings:

Fig. 3 shows a side elevation of the apparatus, the parts being in the position shown in Fig. 2. Fig. 3 further shows the solenoid actuated detent lever for stopping the rotation of the metering drum after each revolution thereof.

Fig. 4 is an end elevation of the tape-feeding portions of the apparatus, looking in the direction of arrow 4 of Fig. 3.

Fig. 5 shows on an enlarged scale a short length of the main hose structure having an interior reinforcing section therein, as made by the apparatus of this invention.

Similar reference characters refer to similar parts throughout the several views.

Figure 2:
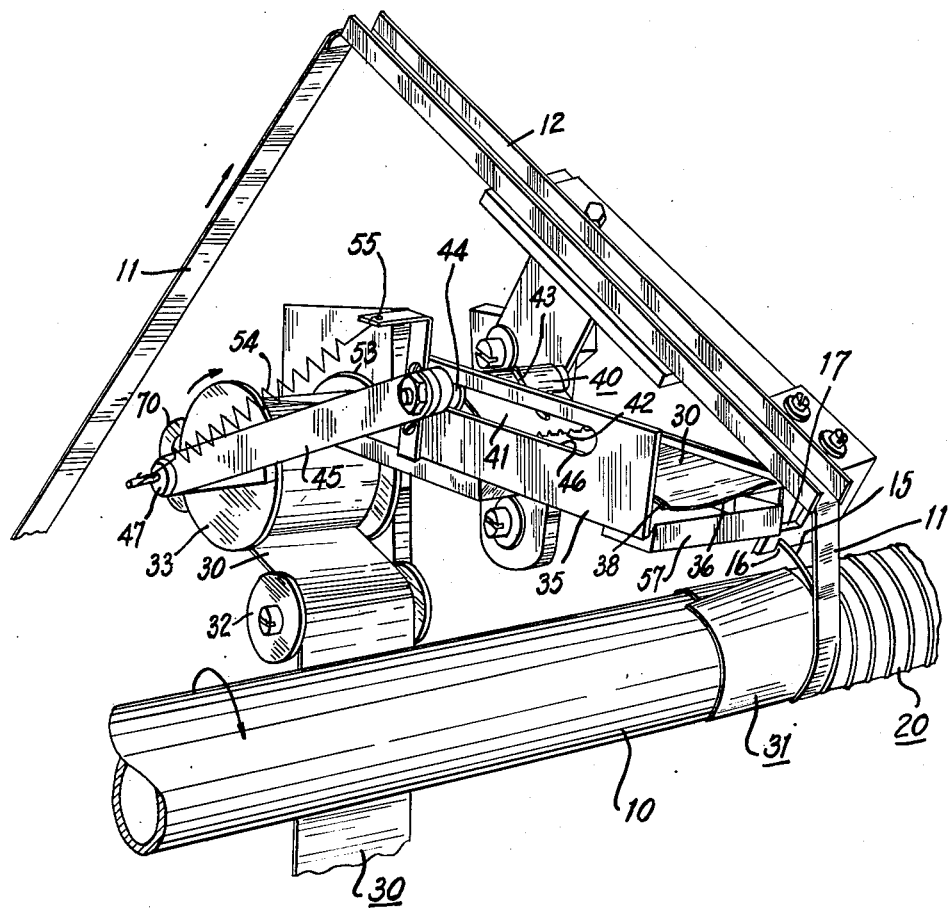
Fig. 2 is a view similar to Fig. 1 but shows the position of the parts immediately after the reinforcing tape has been cut off. The short section of reinforcing tape is shown as being overlaid by the relatively narrow main hose ribbon as it is continuously wrapped upon the rotating mandrel.

Reference numeral 10 designates the continuously rotating and axially travelling metal pipe mandrel upon which the hose is formed. Mandrel 10 is made in sections, say 20 feet long, which are readily coupled end to end to provide in effect a continuous mandrel 10 traveling axially thru the wrapping machine. The main hose ribbon 11 (such as rubberized fabric) is held under suitable tension and guided by chute 12 to mandrel 10 and is helically wrapped thereupon (at such pitch as to provide the desired amount of overlap of the successive turns of ribbon 11). The pitch of the helical wrapping is of course determined by the relative rates of rotation and axial travel of mandrel 10. Fig. 3 shows mandrel 10 being rotated and axially driven by three driving wheels 13 having rubber tires thereon which frictionally engage the periphery of the bare portion of mandrel 10 as it travels toward the point where tape 11 is first applied thereto, as shown in phantom lines in Fig. 3. Those driving wheels 13 engage mandrel 10 at the desired pitch angle to the axis of said mandrel so that both rotate said mandrel 10 and drive it in an axial direction at the desired rate, all in a well-known manner. Preferably a reinforcing wire 15 (see Figs. 2 and 3) is held under suitable tension and guided thru a small slot 16 in the stationary guide plate 17 to mandrel 10 and helically wrapped thereupon along with ribbon 11 so that each turn of wire 15 in the wrapped hose structure 20 lies between successive turns of the ribbon 11, as clearly shown in Fig. 5. This method of making a wire-reinforced hose structure is old in the art. For clarity's sake only so much of the old machine and method is shown in the drawings as is required to clearly disclose applicants' invention in connection therewith. According to applicants' invention, a mechanism is provided to automatically add interior reinforcing wrappings from a separate supply of reinforcing tape to form short lengths of reinforcing sections 31 spaced along the length of the main hose structure.

Applicants' mechanism will now be described.

Figure 1:
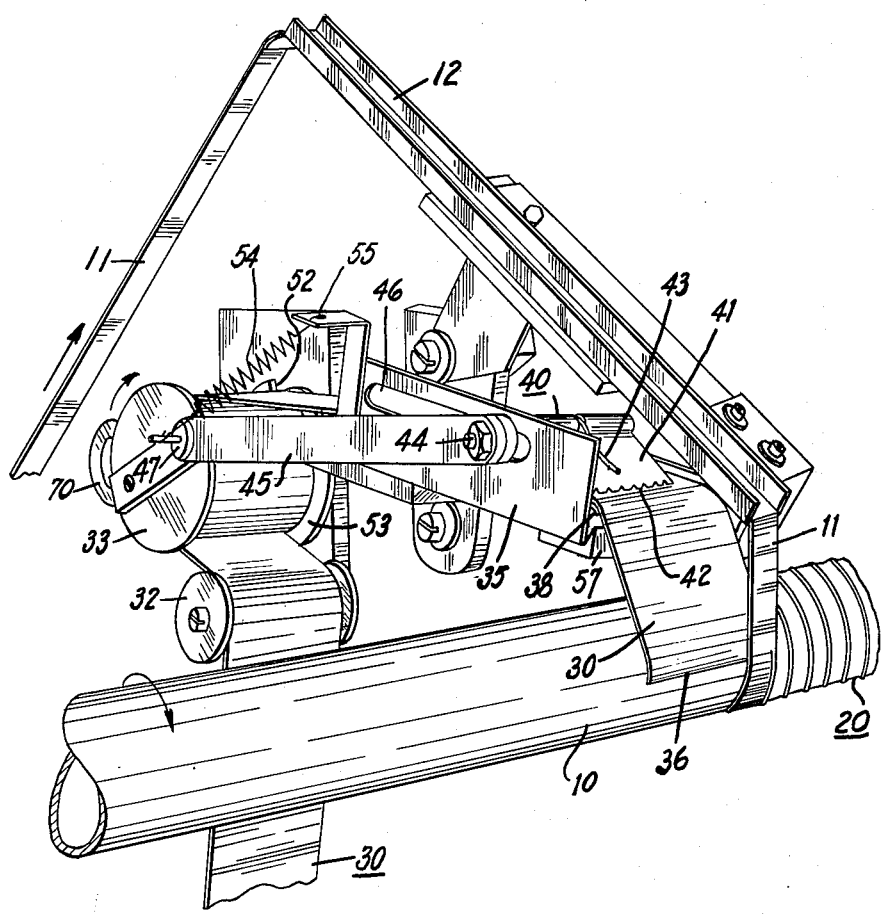
Fig. 1 is a diagrammatic perspective view of the apparatus made according to this invention, and shows how the front end of the reinforcing tape is projected forward to be caught under the main hose ribbon and wrapped upon the continuously rotating mandrel.

The reinforcing tape 30 (of suitable material such as rubberized heavy kraft paper or textile fabric) preferably has a width approximately equal to the length of each reinforcing section 31 to be made therefrom, say 2½ inches wide for a 2 inch diameter hose. Tape 30 is guided from a supply roll (not shown) and passes over guide roller 32, thence around the intermittently rotated metering drum 33, and thence thru chute 35 over the flexible leaf spring 34 (see Fig. 3) which is supported at its fixed end 37 as a cantilever while its free end 38 serves as a yieldably depressible support for tape 30 as it passes from guide chute 35 to the rotating mandrel 10 (see Fig. 1). Metering drum 33 is intermittently rotated one complete revolution at a time (as hereinafter described). Drum 33 actuates a "tape starter" device 40 in chute 35 which projects the free end 36 of tape 30 forward to the position shown in Fig. 1 where one edge thereof will be caught between the rotating mandrel 10 and the advancing main hose ribbon 11 and thereby cause mandrel 10 to start wrapping tape 30 thereupon along with ribbon 11. This tape starter 40 comprises a reciprocable inclined feeder plate 41 having teeth 42 thereon which are urged by the free end of wire spring 43 into non-slipping engagement with the top surface of tape 30 in order to push tape 30 forward and project its free forward end 36 to the position shown in Fig. 1 at the desired moments. Feeder plate 41 is pivotally mounted upon a pin 44 which is fixed to one end of connecting rod 45, but wire spring 43 has its inner concealed end coiled around and fixed to pin 44. Since pin 44 oscillates rotatably thru a small angle by the angular motion of connecting rod 45 it will be clear that spring 43 may be designed to urge feeder plate 41 downwardly against tape 30 only on its forward feeding stroke but substantially free plate 41 from downward pressure on its return stroke. This will permit high speed operation of tape starter 40 and still provide a uniform advance of tape 30 at each forward stroke of feeder plate 41. The to and fro movement of pin 44 is guided by the stationary guide slot 46.

The connecting rod 45 is pivoted at 47 to the outside flange of metering drum 33 and is driven thereby. When the parts are in the position shown in Figs. 2 and 3, the metering drum 33 is positively held against rotation by the detent 50 of spring-loaded trip lever 51 engaging notch 52 on the periphery of flange 53 of metering drum 33. The coiled tension spring 54 is connected to drum 33 at pin 47 and its opposite end is connected to a stationary support at 55, so that the tension of spring 54 causes drum 33 to rotate clockwise as soon as the detent 50 of lever 51 is moved out of its notch 52 to release drum 33. An electric solenoid 60 when energized pulls its armature 61 and connecting link 62 upwardly and thereby trips lever 51 at predetermined instants as hereinafter described. Upon such tripping, detent 50 releases drum 33 whereupon the tension in coil spring 54 immediately rotates drum 33 and thereby causes connecting rod 45 to advance tape starter 40 together with tape 30 in guide chute 35. This projects the free end 36 of tape 30 to position shown in Fig. 1, which causes mandrel 10 to seize the free end 36 and immediately start wrapping tape 30 thereupon. Thus mandrel 10 starts pulling tape 30 forward, which causes tape 30 to temporarily continue the rotation of drum 33 by its frictional hold thereupon. But as soon as drum 33 makes one complete revolution the detent 50 of trip lever 51 will snap into its notch 52 (due to the urge of small tension spring 56) and thereby lock drum 33 against further rotation. Thereupon the tension on tape 30 is greatly increased by the continued pull of the rotating mandrel 10. This increased tension on tape 30 immediately depresses the free end 38 of the flexible spring support 34 in chute 35 and suddenly pulls tape 30 down against the stationary sharp knife edge 57 which cuts it off at point 36 (see Fig. 2). One revolution of metering drum 33 therefore determines the length of tape 30 wrapped upon mandrel 10 at each starting and stopping of said drum that is, at each internal reinforcing section 31 spaced along the length of the main hose structure. Preferably drum 33 is given such a diameter as to provide only slightly more than a single turn of tape 30 at each reinforcing section 31. When knife 57 cuts tape 30 in two the short end portion thereof yet to be wrapped upon mandrel 10 is properly guided by the contacting main tape 11 as it is wrapped smoothly upon mandrel 10.

It is to be noted that each internal reinforcing section 51 will be completely covered over by the main tape 11 and wire 15 without slowing down or otherwise interfering with the normal helical wrapping of the main tape 11 which can continue at a uniform high speed. As an example of the high speed of operation of the mechanism of this invention, a 2 inch diameter mandrel 10 may travel axially at 20 feet per minute and rotate at 640 R. P. M. and so give 32 turns of tape 11 per foot of length of hose. Now in order to apply reinforcing sections 31 spaced at one foot intervals along the hose length, twenty reinforcing sections 31 must by applied in one minute, which means that a complete cycle of operation of the mechanism must occur well within three seconds. The above described mechanism is capable of high speed operation and can normally apply the reinforcing sections 31 at the rate of one per second when such a high speed of cycling is required.

An important feature of applicants' device is the quick-acting automatic cut-off of the reinforcing tape 30 immediately after metering drum 33 is automatically stopped after making one complete revolution, thereby causing sufficiently increased tension on tape 30 to pull it down against the cut-off knife 57. Tape 30 is prevented from slipping over drum 33 by its frictional hold thereupon which may be increased as desired by the spring loaded follower roller 70 which presses tape 30 against drum 33. Preferably the drum 33 has a non-skid soft rubber tread to give it a better frictional hold upon tape 30. Under these conditions when drum 33 is suddenly stopped by detent 50 snapping into notch 52 the resulting increased tension on tape 30 immediately pulls tape 30 against knife 57 by depressing the yieldable spring leaf support 34 in chute 35.

As stated above, electric solenoid 60 is energized at the desired instants to trip lever 51 and thereby initiate a complete cycle of operation of the automatic mechanism. That is, each time solenoid 60 is energized by closing its electric circuit the mechanism immediately acts at high speed to apply a reinforcing section 31 to the main hose structure. Preferably solenoid 60 is automatically energized at the desired instants by providing a series of electric switches spaced along the track (not shown) which supports the axially travelling mandrel 10, each switch having a switch-closing arm actuated by the travelling dolly supporting the forward end of mandrel 10, so that as the mandrel advances down the track the series of switches will be closed successively at the proper intervals. If so desired solenoid 60 may have its circuit closed at the desired instants by various other arrangements, for instance, by a rotary switch arm suitably geared to some part of the wrapping machine mechanism so as to close the circuit of solenoid 60 after each predetermined number of revolutions of mandrel 10.

While the embodiment of the present invention as herein disclosed, constitutes a preferred form, it is to be understood that other forms might be adopted.

What is claimed is as follows:

1. In a machine for making helically wrapped hose, in combination, a rotating and axially travelling mandrel, means for continuously wrapping a main ribbon of hose material upon said mandrel to form a helically wrapped main hose structure extending continuously over the length of said mandrel, intermittently actuated means for projecting at spaced locations along said mandrel the end of a continuous length of reinforcing tape between said mandrel and said main ribbon as said ribbon passes tangentially upon said mandrel so that said tape is caught by said rotating mandrel and wrapped directly thereupon inside of said main hose structure, and intermittently actuated means for cutting said reinforcing tape which is wrapped upon said mandrel at each of said spaced locations.

2. In a machine for making helically wrapped hose, in combination, a rotating and axially travelling mandrel, means for continuously wrapping a main ribbon of hose material upon said mandrel to form a helically wrapped main hose structure extending continuously over the length of said mandrel, automatic means for intermittently adding relatively short reinforcing sections of reinforcing tape on the inside surface of said main hose structure at spaced locations along the length thereof, said automatic means comprising: a reciprocable tape feeder device for intermittently projecting the end of a continuous length of reinforcing tape between the rotating mandrel and said main ribbon of hose material as it passes tangentially upon said mandrel so that said projected end is caught between said mandrel and said main ribbon and thereby started being wrapped upon said rotating mandrel and intermittently actuated means for automatically cutting off the reinforcing tape after approximately one turn thereof has been wrapped upon said mandrel to form each of said reinforcing sections.

3. In a machine for making helically wrapped hose, in combination, a rotating and axially travelling mandrel, means for continuously wrapping a main ribbon of hose material upon said mandrel to form a helically wrapped main hose structure extending continuously over the length of said mandrel, automatic means for intermittently adding relatively short reinforcing sections of reinforcing tape on the inside surface of said main hose structure at spaced locations along the length thereof, said automatic means comprising: a reciprocable tape feeder device for projecting the end of a continuous length of reinforcing tape between the rotating mandrel and said main ribbon of hose material as it passes tangentially upon said mandrel so that said projected end is caught between said mandrel and said main ribbon and thereby started being wrapped upon said rotating mandrel to form a reinforcing section on the interior of said main hose structure, a metering drum intermittently rotated one revolution at a time for permitting a length of said reinforcing tape to pass to said rotating mandrel, a positive stop for stopping the rotation of said metering drum after each revolution thereof whereby to stop further travel of said reinforcing tape therearound, and means actuated by the increased tension in said tape after said drum is stopped for automatically cutting off the length of reinforcing tape forming each of said reinforcing sections.

4. In a machine for making helically wrapped hose and for providing reinforced sections at spaced-apart locations along said hose, the combination comprising; a rotating, axially traveling mandrel upon which said hose is to be formed, wrapping means positioned in one location for continuously wrapping a helically disposed ribbon of hose material onto said traveling mandrel for continuously forming a hose thereon, tape projecting means intermittently operated for feeding reinforcing tape to said mandrel which tape is wrapped inside of said hose as it is being formed by said ribbon, and cutting means intermittently operable for severing said tape whereby reinforced sections at spaced-apart locations are provided in said hose.

EDWARD P. HARRIS.
FREDERICK W. SAMPSON.

REFERENCES CITED

The following references are of record in the file of this patent:

UNITED STATES PATENTS

| Number | Name | Date |
|---|---|---|
| 2,026,996 | Raflovich | Jan. 7, 1936 |
| 2,489,503 | Sampson et al. | Nov. 29, 1949 |